United States Patent
Clark et al.

(10) Patent No.: US 9,162,642 B2
(45) Date of Patent: Oct. 20, 2015

(54) METHOD AND SYSTEM FOR DETERMINING A PRIMARY DIRECTION OF FORCE RESULTING FROM A VEHICLE COLLISION

(71) Applicant: Ford Global Technologies, Dearborn, MI (US)

(72) Inventors: Todd N. Clark, Dearborn, MI (US); Jason Shomsky, Taylor, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/670,622

(22) Filed: Mar. 27, 2015

(65) Prior Publication Data

US 2015/0197207 A1     Jul. 16, 2015

Related U.S. Application Data

(63) Continuation-in-part of application No. 13/645,542, filed on Oct. 5, 2012, now abandoned.

(51) Int. Cl.
*B60R 21/0132*     (2006.01)

(52) U.S. Cl.
CPC .................................. *B60R 21/0132* (2013.01)

(58) Field of Classification Search
CPC ........ B60N 2/143; B60N 2/146; B60N 2/245; B60N 2/2821; B60N 2/2839; B60N 2/286; B60N 7/005; B60R 21/0132; B60R 21/0136; B60W 40/10; E21C 37/16; E21C 41/24; E21C 41/26; E21C 41/31; E21C 41/32; G07C 9/00896; G08C 17/02; G06F 17/5018; G06N 7/005; H04B 7/18578; H04B 7/195; Y10T 70/5031

See application file for complete search history.

(56) References Cited

U.S. PATENT DOCUMENTS

| | | |
|---|---|---|
| 4,243,248 A | 1/1981 | Scholz et al. |
| 5,365,114 A | 11/1994 | Tsurushima et al. |

(Continued)

FOREIGN PATENT DOCUMENTS

| | | |
|---|---|---|
| EP | 2048039 A2 | 4/2009 |
| EP | 2048039 A3 | 5/2010 |

(Continued)

OTHER PUBLICATIONS

"14670622 Proposed Claim Amendments for Allowance v2"; authored by: Attoney Angela Brunetti; recieved: )Jul. 8, 2015.*

(Continued)

*Primary Examiner* — James Trammell
*Assistant Examiner* — James E Stroud
(74) *Attorney, Agent, or Firm* — Angela M Brunetti; Frank MacKenzie

(57) ABSTRACT

A vehicle comprises an acceleration sensing module and a crash direction-computing module. The acceleration-sensing module is configured for generating acceleration information resulting from a vehicle collision event. The acceleration information includes a first direction acceleration value and a second direction acceleration value. The crash direction-computing module is coupled to the acceleration-sensing module for receiving the acceleration information therefrom and is configured for determining impact direction information resulting from the vehicle collision event. Generating the impact direction information includes deriving a first direction delta velocity value from the first direction acceleration value, deriving a second direction delta velocity value from the second direction acceleration value, determining a first delta velocity threshold value based on a delta velocity threshold angle and the first direction delta velocity value, and determining an impact zone based on the first delta velocity threshold value and the second direction delta velocity value.

24 Claims, 4 Drawing Sheets

(56) References Cited

U.S. PATENT DOCUMENTS

| | | | |
|---|---|---|---|
| 5,424,583 | A | 6/1995 | Spies et al. |
| 5,948,032 | A | 9/1999 | Huang et al. |
| 6,025,790 | A * | 2/2000 | Saneyoshi ............... 340/946 |
| 6,157,881 | A | 12/2000 | Wessels |
| 6,863,302 | B2 | 3/2005 | Stopczynski |
| 7,263,460 | B2 | 8/2007 | Fendt et al. |
| 7,343,232 | B2 | 3/2008 | Duggan et al. |
| 7,484,756 | B2 | 2/2009 | Le et al. |
| 7,607,510 | B1 | 10/2009 | Mun |
| 7,739,004 | B2 * | 6/2010 | Johnson ............... 701/9 |
| 7,904,223 | B2 | 3/2011 | Le et al. |
| 8,068,949 | B2 * | 11/2011 | Duggan et al. ............ 701/24 |
| 8,150,101 | B2 * | 4/2012 | Haanpaa et al. .......... 382/103 |
| 8,316,555 | B2 * | 11/2012 | Goossen et al. .......... 33/561 |
| 8,359,178 | B2 * | 1/2013 | Rowe et al. ............. 702/85 |
| 8,380,425 | B2 * | 2/2013 | Duggan et al. ........... 701/301 |
| 8,386,095 | B2 * | 2/2013 | Fitzpatrick ............. 701/4 |
| 8,751,061 | B2 * | 6/2014 | Coulmeau et al. ........ 701/2 |
| 8,812,195 | B2 * | 8/2014 | Suzuki et al. ........... 701/45 |
| 8,825,277 | B2 * | 9/2014 | McClellan et al. ....... 701/32.2 |
| 9,056,754 | B2 * | 6/2015 | Wong et al. ............. 1/1 |
| 9,067,565 | B2 * | 6/2015 | McClellan et al. ....... 1/1 |
| 2008/0306996 | A1 | 12/2008 | McClellan et al. |
| 2009/0099734 | A1 | 4/2009 | Let et al. |
| 2009/0248253 | A1 | 10/2009 | Le et al. |
| 2010/0057302 | A1 | 3/2010 | Foo et al. |
| 2010/0228424 | A1 | 9/2010 | Clark et al. |
| 2011/0137528 | A1 | 6/2011 | Let et al. |

FOREIGN PATENT DOCUMENTS

| | | |
|---|---|---|
| EP | 2261089 A1 | 12/2010 |
| JP | 10185943 A | 7/1998 |

OTHER PUBLICATIONS

"U.S. Appl. No. 14/670,622 Proposed Claim Amendments to Correct Dependency Issues (Aug. 25, 2015)"; authored by: Attonery Angela Brunetti; recieved: Aug. 25, 2015.*

* cited by examiner

METHOD AND SYSTEM FOR DETERMINING A PRIMARY DIRECTION OF FORCE RESULTING FROM A VEHICLE COLLISION

CROSS REFERENCE TO RELATED APPLICATIONS

This patent application is a continuation-in-part of U.S. patent application Ser. No. 13/645,542, which was filed on Oct. 5, 2012, entitled "METHOD AND SYSTEM FOR DETERMINING A PRIMARY DIRECTION OF FORCE RESULTING FROM A VEHICLE COLLISION", which is hereby incorporated by reference in its entirety.

FIELD OF THE DISCLOSURE

The disclosures made herein relate generally to vehicle crash algorithms and, more particularly, to methods and systems for determining information associated with forces applied on a vehicle during a collision.

BACKGROUND

It is well known that active/passive safety integration has become more prevalent in the automotive industry. This being the case, there has been a greater need for knowing not only if a vehicle has been in a collision, but also a primary direction of force resulting from the collision. By knowing the primary direction of force from the collision and preferably also a higher resolution of force direction, capabilities of vehicle safety features such as occupant restraint activation, vehicle post impact braking, post impact stability control, fuel cut-off, and the like can be enhanced.

Therefore, determining a primary direction of force resulting from a vehicle collision with a high degree of resolution would be beneficial, desirable and useful.

SUMMARY OF THE DISCLOSURE

Embodiments of the inventive subject matter are directed to determining a direction of force resulting from a vehicle collision. More specifically, embodiments of the inventive subject matter enable an impact force direction corresponding to a high-resolution impact zone (e.g., front right impact zone, front full, front left) to be determined as well as an impact force direction corresponding to an impact quadrant (e.g., front, side, rear) to be determined. An impact sector can be determined jointly from the impact quadrant and impact zone. The impact force direction corresponding to the impact sector is referred to herein as a primary force direction. Advantageously, the ability to determine the impact sector as opposed to only an impact quadrant or impact zone enables vehicle safety features to be implemented with greater sophistication and precision.

In one embodiment of the inventive subject matter, a method for determining a direction of force resulting from a vehicle collision comprises a plurality of operations. An operation is performed for acquiring acceleration information resulting from a vehicle collision event. The acceleration information includes a first direction acceleration value and a second direction acceleration value. Operations are performed for determining a first direction delta velocity value based on the first direction acceleration value and for determining a second direction delta velocity value based on the second direction acceleration value. Thereafter, an operation is performed for determining a first delta velocity threshold value based on a first delta velocity threshold angle and the first direction delta velocity value. After determining the first delta velocity threshold value, an operation is performed for determining an impact zone of the vehicle at which an impact from the vehicle collision event has occurred. The impact zone is determined based on the first delta velocity threshold value and the second direction delta velocity value. One or more one data processing devices access, from memory coupled to the one or more data processing devices, instructions for causing the one or more data processing devices to carry out such operations.

In another embodiment of the inventive subject matter, a vehicle comprises an acceleration sensing module and a crash direction computing module. The acceleration sensing module is configured for generating acceleration information resulting from a vehicle collision event. The acceleration information includes a first direction acceleration value and a second direction acceleration value. The crash direction computing module is coupled to the acceleration sensing module for receiving the acceleration information therefrom and is configured for determining impact direction information resulting from the vehicle collision event. Generating the impact direction information includes deriving a first direction delta velocity value from the first direction acceleration value, deriving a second direction delta velocity value from the second direction acceleration value, determining a first delta velocity threshold value based on a delta velocity threshold angle and the first direction delta velocity value, and determining an impact zone based on the first delta velocity threshold value and the second direction delta velocity value.

In another embodiment of the inventive subject matter, an electronic controller system of a vehicle has a set of instructions tangibly embodied on a non-transitory processor-readable medium thereof. The set of instructions are accessible from the non-transitory processor-readable medium by at least one data processing device of the electronic controller system for being interpreted thereby. The set of instructions is configured for causing the at least one data processing device to carry out a plurality of operations. An operation is performed for acquiring acceleration information resulting from a vehicle collision event. The acceleration information includes a first direction acceleration value and a second direction acceleration value. The first direction acceleration value corresponds to a direction extending substantially perpendicular to a direction corresponding to the second direction acceleration value. Operations are performed for determining a first direction delta velocity value based on the first direction acceleration value and for determining a second direction delta velocity value based on the second direction acceleration value. An operation is then performed for determining a first delta velocity threshold value based on a first delta velocity threshold angle and the first direction delta velocity value. After determining the first delta velocity threshold value, an operation is performed for determining an impact zone of the vehicle at which an impact from the vehicle collision event has occurred. The impact zone is determined based on the first delta velocity threshold value and the second direction delta velocity value.

These and other objects, embodiments, advantages and/or distinctions of the inventive subject matter will become readily apparent upon further review of the following specification, associated drawings and appended claims.

DETAILED DESCRIPTION OF THE DRAWING FIGURES

Figure 1:
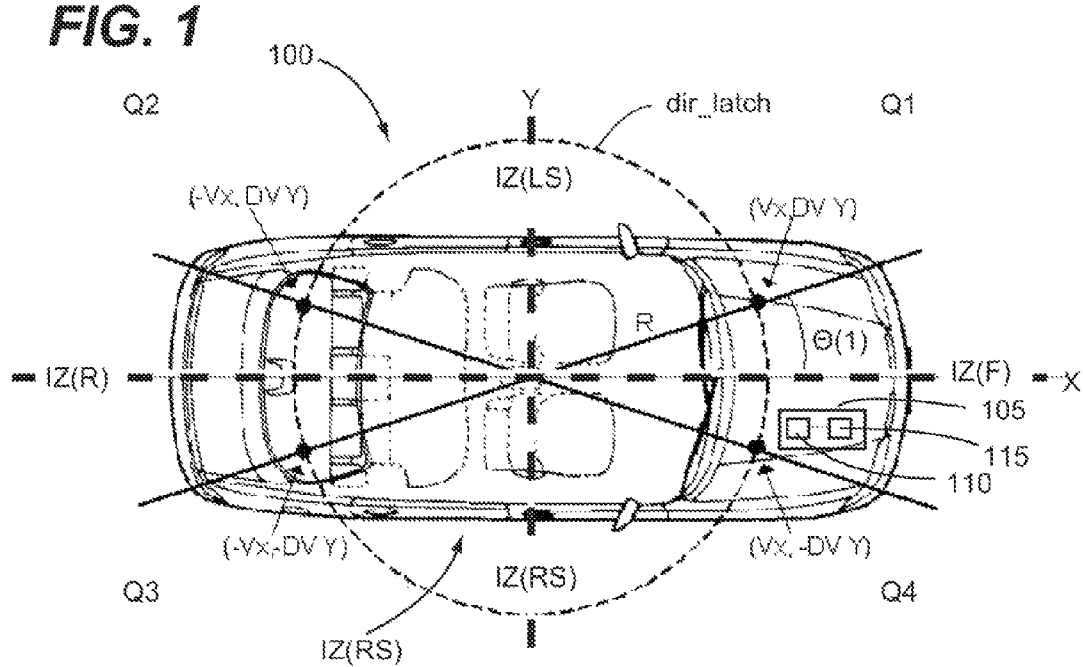
FIG. 1 is a diagrammatic view showing crash direction information in relation to a vehicle having crash direction functionality configured in accordance with an embodiment of the inventive subject matter.
Figure 2:
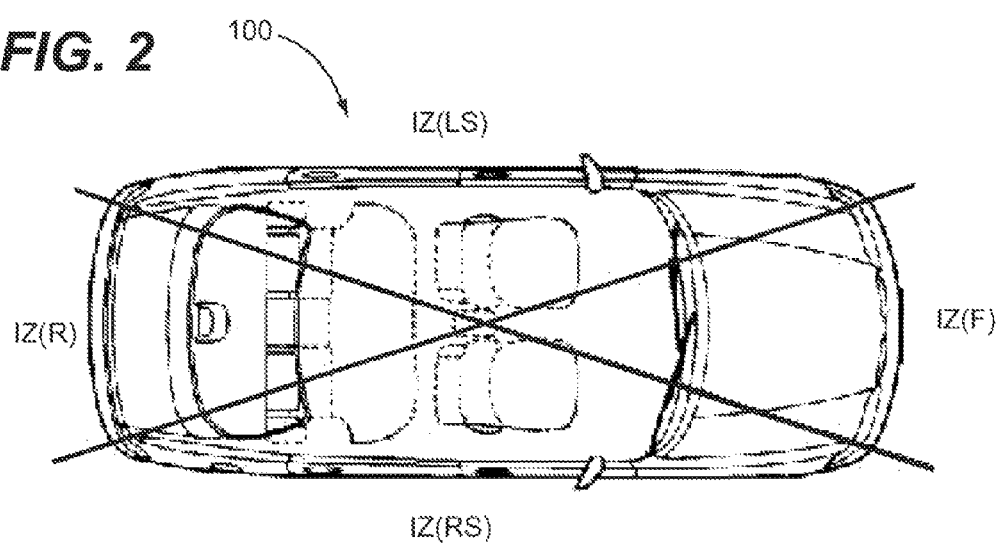
FIG. 2 is a diagrammatic view showing impact zones for the vehicle of FIG. 1.

Referring to FIGS. 1 and 2, a vehicle 100 has a restraint control module 105 configured for implementing crash direction functionality in accordance with an embodiment of the inventive subject matter. The restraint control module 105 includes an algorithm for implementing such crash direction functionality (i.e., crash direction algorithm 110) and an algorithm for implementing known impact recognition functionality (i.e., impact recognition algorithm 115). Alternatively, the crash direction algorithm 110 can be implemented in a separate standalone computing module (i.e., a crash direction computing module). In some embodiments of the inventive subject matter, crash direction functionality in accordance with an embodiment of the inventive subject matter can be implemented as an enhancement to an existing restraint control module of a vehicle platform.

In response to the vehicle 100 being involved in a collision event (i.e., a vehicle collision event), the restraint control module 105 (e.g., the impact recognition algorithm 115 thereof) generates acceleration information exhibited by the vehicle 100 as a result of an impact from the vehicle collision event. The acceleration information includes an X-direction (i.e., first direction) acceleration value and a Y-direction (i.e., second direction) acceleration value. Such acceleration information can be generated from output of two accelerometers mounted with their respective sensing directions orientated perpendicular to each other. The X-direction corresponds to a direction along the x-axis shown in FIG. 1 and the Y-direction corresponds to a direction along the y-axis shown in FIG. 1. As shown in FIG. 1, the X-direction corresponds to a longitudinal direction of the vehicle 100 and the Y-direction corresponds to a lateral direction of the vehicle. However, in certain other embodiments, these directions can be reversed. In this regard, the X-direction acceleration value and the Y-direction acceleration value correspond to directions extending substantially perpendicular to each other.

The restraint control module 105 (e.g., the impact recognition algorithm 115 thereof) derives an X-direction delta velocity value V(X) from the X-direction acceleration value and derives a Y-direction delta velocity value V(Y) from the Y-direction acceleration value. For example, an acceleration value can be integrated as a function of time to generate a corresponding delta velocity value. The delta velocity values represent a change in velocity of the vehicle along the respective measurement axis associated with the respective force of impact. Alternatively, a control module other than the restraint control module 105 can generate the acceleration information and/or the corresponding delta velocity values and provide it to the crash direction algorithm 110. For example, in the case where a vehicle does not possess a restraint control module, a crash direction computing module configured in accordance with an embodiment of the inventive subject matter can perform such functionality and any necessary related functionality.

In accordance with one such known technique and as illustrated in FIG. 1, the crash direction algorithm 110 can use the X-direction delta velocity value V(X) and the Y-direction delta velocity value V(Y) for determining a vehicle quadrant at which the impact of the vehicle collision event has occurred (i.e., the impact quadrant). Alternatively, the impact recognition algorithm 115 can use the X-direction delta velocity value V(X) and the Y-direction delta velocity value V(Y) for determining a vehicle quadrant at which the impact of the vehicle collision event has occurred. Although such quadrant information is useful, it is of a relatively low-resolution of information (i.e., primary direction of force from impact) in regard to representing a direction of impact resulting from the vehicle collision event. As shown in FIG. 1, the area of each quadrant encompasses a relatively large area of the vehicle 100. In this regard, a specific direction of impact is not readily known but is rather a general direction of impact as represented by a corresponding quadrant of the vehicle 100. Table 1 below shows the delta velocity conditions corresponding to each quadrant.

TABLE 1

Quadrant Delta Velocity Conditions

| X-Direction Delta Velocity Value V(X) | Y-Direction Delta Velocity Value V(Y) | Quadrant |
|---|---|---|
| greater than or equal to zero | greater than or equal to zero | Quadrant 1 (Q1) |
| less than or equal to zero | greater than zero | Quadrant 2 (Q2) |
| less than zero | less than or equal to zero | Quadrant 3 (Q3) |
| greater than or equal to zero | less than zero | Quadrant 4 (Q4) |

Advantageously, the impact direction information (i.e., primary direction of force from impact) generated by the crash direction algorithm 110 is of a higher resolution that that generated using known techniques (e.g., impact quadrant information alone). To this end, the crash direction algorithm 110 receives the X-direction delta velocity value V(X) and the Y-direction delta velocity value V(Y) (i.e., delta velocity information) and uses the X-direction delta velocity value V(X) and the Y-direction delta velocity value V(Y) for determining impact direction information resulting from the vehicle collision event.

In one embodiment of the inventive subject matter, determining impact direction information includes determining an impact zone based on a first delta velocity threshold value DV(Y) and the Y-direction delta velocity value. The first delta velocity threshold value DV(Y) is based on a first delta velocity threshold angle Θ(L) and the X-direction delta velocity value V(X). As shown in FIG. 2, the first delta velocity threshold angle Θ(1) is a parameter calibrated to define an area of a front impact zone IZ(F), an area of a left side impact zone IZ(LS), an area of a right side impact zone IZ(RS), and an area of a rear end impact zone IZ(R) as a function of the first delta velocity threshold angle Θ(1).

Figure 3:
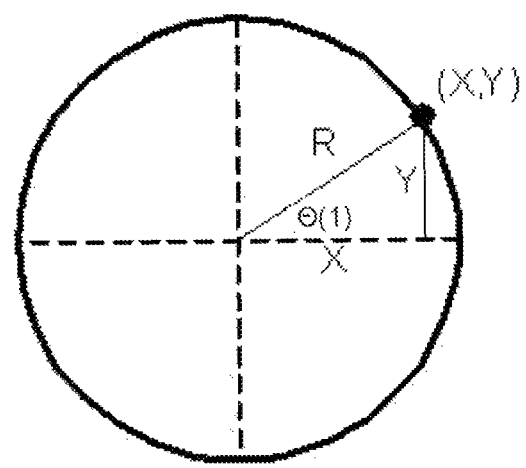
FIG. 3 is a diagrammatic view showing equations for a circle used in determining a delta velocity threshold value in accordance with an embodiment of the inventive subject matter.

In one implementation of the inventive subject matter, equations for a circle are used for determining the first delta velocity threshold value DV(Y). The equation parameters for a circle are shown in FIG. 3 and the corresponding equations for a circle are:

$$R = X/\cos \Theta(1);$$ and $$Y = R * \sin \Theta(1).$$

Accordingly, for any sample of the X-direction delta velocity value V(X), a corresponding instance of the first delta velocity threshold value DV(Y) can be determined using the first delta velocity threshold angle $\Theta(1)$ as follows:

$$R = X\text{-direction delta velocity value}/\cos \Theta(1);$$ and $$DV(Y) = R * \sin \Theta(1).$$

Once the first delta velocity threshold value DV(Y) is calculated, as shown in FIG. 2, this value can be used for determining a corresponding impact zone that represents a direction of impact of the vehicle collision event. As can be seen in FIG. 2, the area of each impact zone is a function of the first delta velocity threshold angle $\Theta(1)$. For some impact zones, a specific direction of impact is more readily inferred from the impact zone whereas, for other impact zones, the specific direction of impact is not readily known but is rather a general direction of impact as represented by a corresponding impact zone. Table 2 below shows the delta velocity conditions corresponding to each impact zone.

TABLE 2

Impact Zone Delta Velocity Conditions

| X-Direction Delta Velocity Value V(X) | Y-Direction Delta Velocity Value V(Y) | Impact Zone |
|---|---|---|
|  | greater than +DV(Y) | Left Side Impact Zone (IZ(LS)) |
|  | less than −DV(Y) | Right Side Impact Zone (IZ(RS)) |
| greater than zero | greater than −DV(Y) and less than +DV(Y) | Front Impact Zone (IZ(F)) |
| less than zero | greater than −DV(Y) and less than +DV(Y) | Rear Impact Zone (IZ(R)) |

Figure 4:
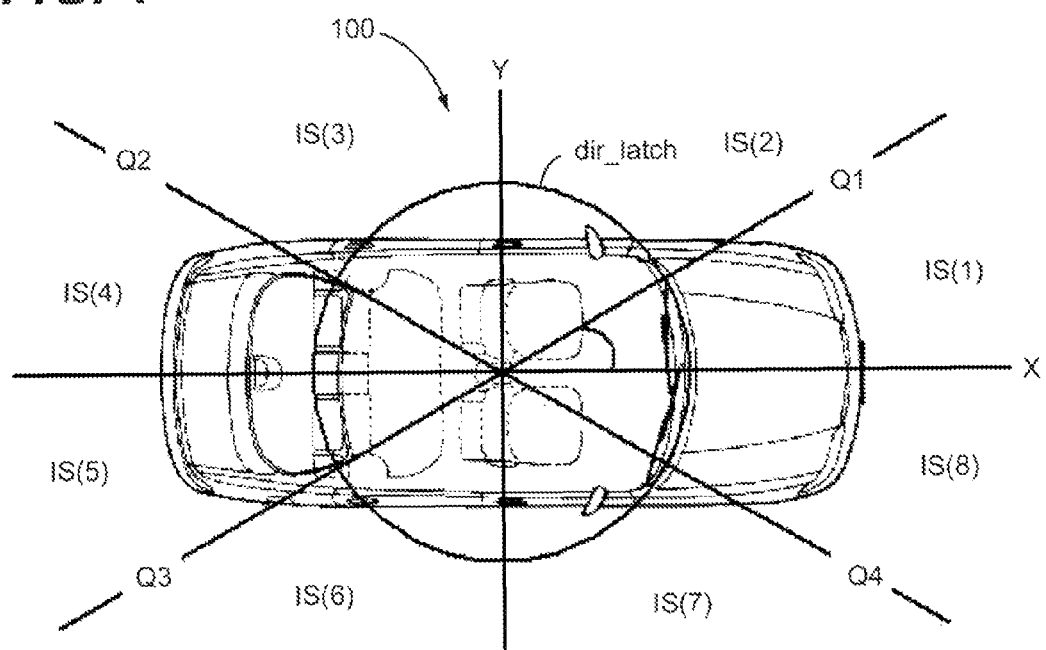
FIG. 4 is a diagrammatic view showing impact sectors in accordance with a first order of resolution for the vehicle of FIG. 1.

In the case where the vehicle 100 is configured for determining the impact quadrant at which the impact of the vehicle collision event has occurred and for determining the impact zone, these two types of impact direction characterizations can be used in combination to define the primary direction of force from impact to a higher degree of resolution than is provided individually be either the impact quadrant or the impact zone. As shown in FIG. 4, by using impact quadrant information in combination with impact zone information, eight (8) impact sectors can be defined. Table 3 below shows the quadrant and impact zone conditions corresponding to each impact sector.

TABLE 3

Quadrant And Impact Zone Conditions For One Delta Velocity Threshold Angle

| Quadrant | Impact Zone | Impact Sector |
|---|---|---|
| Quadrant 1 (Q1) | Front Impact Zone (IZ(F)) | IS(1) |
| Quadrant 1 (Q1) | Left Side Impact Zone (IZ(LS)) | IS(2) |
| Quadrant 2 (Q2) | Left Side Impact Zone (IZ(LS)) | IS(3) |
| Quadrant 2 (Q2) | Rear Impact Zone (IZ(R)) | IS(4) |
| Quadrant 3 (Q3) | Rear Impact Zone (IZ(R)) | IS(5) |
| Quadrant 3 (Q3) | Right Side Impact Zone (IZ(RS)) | IS(6) |
| Quadrant 4 (Q4) | Right Side Impact Zone (IZ(RS)) | IS(7) |
| Quadrant 4 (Q4) | Front Impact Zone (IZ(F)) | IS(8) |

Figure 5:
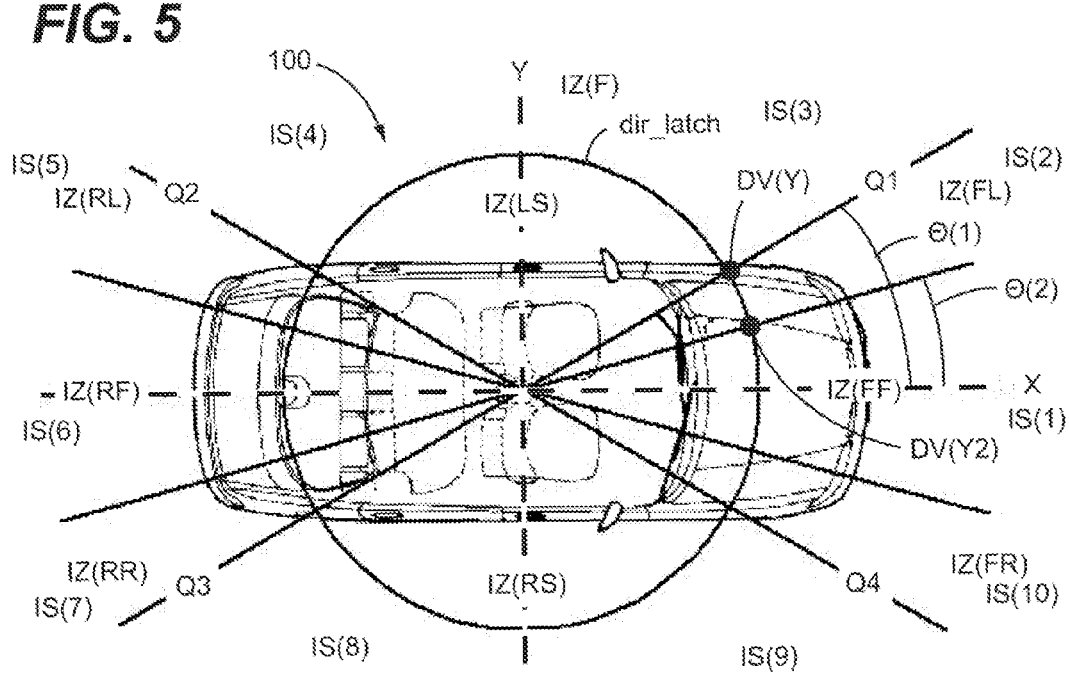
FIG. 5 is a diagrammatic view showing impact sectors in accordance with first and second orders of resolution for the vehicle of FIG. 1.

In view of the disclosures made herein with respect to determination of impact zones, a skilled person will appreciate that additional resolution of direction of force with respect impact zone quantity and placement can be implemented through use of one or more additional delta velocity threshold angles in addition to the first delta velocity threshold angle $\Theta(1)$. For example, as shown in FIG. 5, a second delta velocity threshold angle $\Theta(2)$ can be used in combination with the first delta velocity threshold angle $\Theta(1)$ to provide a high resolution of direction of force at the front and rear regions of the vehicle 100 than with a single delta velocity threshold angle. Specifically, impact quadrants and impact zones of a first order of resolution can be determined based on delta velocity information (e.g., V(X) and V(Y)) and the first delta velocity threshold angle $\Theta(1)$, as described above. In conjunction with such determination of the impact quadrants and impact zones of the first order of resolution, impact zones of a second order of resolution can be determined based on the delta velocity information and a second delta velocity threshold angle $\Theta(2)$. The second delta velocity threshold angle $\Theta(2)$ further segments impact zones defined by the first delta velocity threshold angle $\Theta(1)$. For example, as shown in FIG. 5, the front impact zone IZ(F) and rear (i.e., opposing) impact zone IZ(R) can each be segmented into three (3) impact zones (e.g., to provide additional resolution of direction of force. In this regard, a total often (10) impact sectors can be provided for when impact quadrant information is combined with impact zones derived from two delta velocity threshold angles.

In one embodiment of the inventive subject matter, determination of impact zones derived from two delta velocity threshold angles includes determining the first delta velocity threshold value DV(Y) based on the first delta velocity threshold angle $\Theta(1)$ and X-direction delta velocity value V(X), as described above. A second delta velocity threshold value DV(Y2) based on the second delta velocity threshold angle $\Theta(2)$ and the X-direction delta velocity value V(X) is determined in the same manner used for determining the first delta velocity threshold value DV(Y). As shown in FIG. 5, the first delta velocity threshold value DV(Y) and the second delta velocity threshold value DV(Y2) jointly define three front impact zones and three rear impact zones. Two side impact sectors one each side of the vehicle 100 are jointly defined by the impact quadrants and the first delta velocity threshold value DV(Y). In this embodiment, determining the impact zone includes determining a relative difference between the first delta velocity threshold value DV(Y) and the second direction delta velocity value V(Y) and, if the second direction delta velocity value V(Y) is less than a positive instance of the first delta velocity threshold value DV(Y) or greater than a negative instance of the first delta velocity threshold value DV(Y), determining a relative difference between the second delta velocity threshold value and the second direction delta velocity value. In this manner, the impact zone jointly defined by the first delta velocity threshold value DV(Y) and the second delta velocity threshold value DV(Y2) can be determined for the given delta velocity information. Specifically, as disclosed above, the impact zone and impact quadrant can be used for determining the impact sector corresponding to the direction of force. Table 4 below shows the quadrant and impact zone conditions corresponding to each impact sector.

TABLE 4

Quadrant And Impact Zone Conditions For
Two Delta Velocity Threshold Angles

| Quadrant | Impact Zone | Impact Sector |
|---|---|---|
| Q1 or Q4 | IZ(FF) | IS(1) |
| Q1 | IF(LF) | IS(2) |
| Q1 | IZ(LS) | IS(3) |
| Q2 | IZ(LS) | 1S(4) |
| Q2 | IZ(RL) | IS(5) |
| Q2 or Q3 | IZ(RF) | IS(6) |
| Q3 | IZ(RR) | IS(7) |
| Q3 | IZ(RS) | IS(8) |
| Q4 | IZ(RS) | IS(9) |
| Q4 | IZ(RF) | IS(10) |

From the foregoing discussion, a skilled person will appreciate that the first delta velocity threshold angle $\Theta(1)$ is used for distinguishing front impacts from side impacts. If a side impact is detected, impact quadrant information can be used for determining what area of the vehicle was impacted (i.e., the forward or rear portion on either side). If it is determined that the impact is a side impact, it is not necessary to further derive or assess information that is based on the second delta velocity threshold angle $\Theta(2)$. In this regard, if assessment of information based on the first delta velocity threshold angle $\Theta(1)$ reveals that the vehicle has been subjected to a front or rear impact, information derived from the second delta velocity threshold angle $\Theta(2)$ is assessed for determining a specific area of the front or rear of the vehicle (i.e., impact sector) at which the impact has occurred.

In regard to implementing crash direction functionality in an electronic controller system of the vehicle 100, the restraint control module 105 can include a data processing device and memory coupled to the data processing device. Instructions representing the crash direction algorithm 110 and, optionally, the impact recognition algorithm 115 are accessible by the data processing device from the memory. In view of the disclosures made herein, a skilled person will appreciate methods, processes and/or operations configured for carrying out crash direction functionality as disclosed herein are tangibly embodied by a non-transitory computer readable medium having instructions thereon that are configured for carrying out such functionality.

Figure 6:
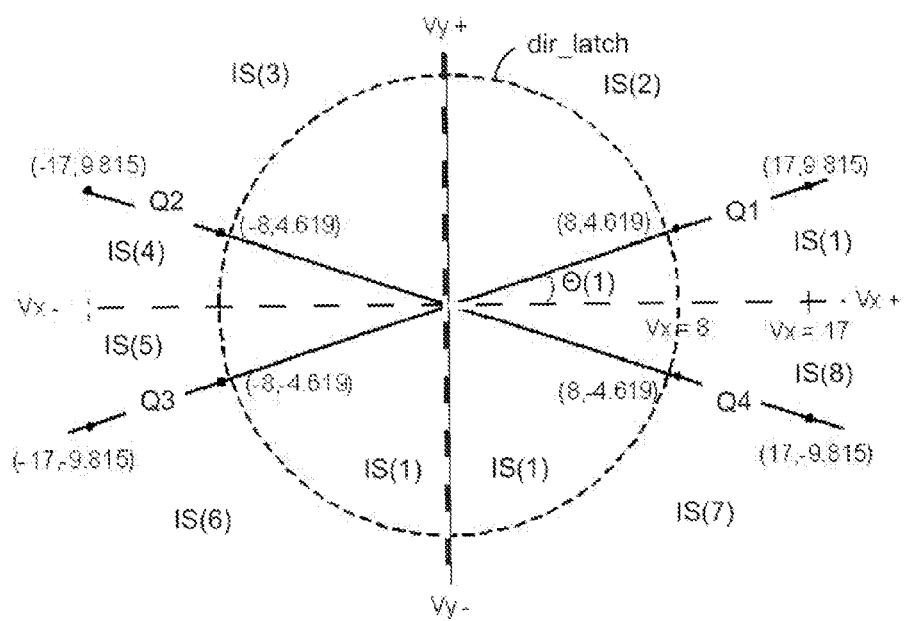
FIG. 6 is an impact sector graph showing delta velocity threshold information in relation to a direction latch radius.

For simplifying real-time processing of information and reducing processing time, a delta velocity threshold value lookup table, such as that shown below, can be created for implementing crash direction functionality in accordance with the inventive subject matter. The delta velocity threshold value lookup table correlates X-direction delta velocity values V(X) to corresponding delta velocity threshold values DV(Y). The contents of the delta velocity threshold value lookup table are derived using two calibration parameters: V(X)_max and delta velocity threshold angle $\Theta$. V(X)_max is the maximum X-direction delta velocity value that is to be used in determining a direction of force using crash direction functionality configured in accordance with the inventive subject matter. The use of equations of a circle in implementing crash direction functionality configured in accordance with the inventive subject matter allows a single delta velocity threshold value lookup table to be used for all directions of impact (e.g., absolute value comparison). Table 4 below shown an example of a delta velocity threshold value lookup table where V(X)_max=17, delta velocity threshold angle $\Theta$=30 degrees, and step size=1. FIG. 6 shows the data of Table 4 applied to an impact sector graph 200 configured in accordance with an embodiment of the inventive subject matter.

TABLE 4

Delta Velocity Threshold Value Lookup Table

| X-Direction Delta Velocity Value V(X) | Delta Velocity Threshold Value DV(Y) |
|---|---|
| 0 | 0 |
| 1 | 0.577350269 |
| 2 | 1.154700538 |
| 3 | 1.732050808 |
| 4 | 2.309401077 |
| 5 | 2.886751346 |
| 6 | 3.464101615 |
| 7 | 4.041451884 |
| 8 | 4.618802154 |
| 9 | 5.196152423 |
| 10 | 5.773502692 |
| 11 | 6.350852961 |
| 12 | 6.928203230 |
| 13 | 7.505553499 |
| 14 | 8.082903769 |
| 15 | 8.660254038 |
| 16 | 9.237604307 |
| 17 | 9.814954576 |

Discussed now will be the concept and implementation of "latch" in the context of crash direction functionality in accordance with the inventive subject matter. Latch is a process (i.e., the latch process) used by a crash direction algorithm configured in accordance with the inventive subject matter and/or impact recognition algorithm configured in accordance with a known approach or enhanced with crash direction functionality as disclosed herein. The latch process is used to determine when to stop calculating the direction of force from a vehicle collision event and holds the last direction of force that has been calculated. This last direction indicates a corresponding primary direction of force (i.e., impact sector) resulting from the vehicle collision event. The benefit of the latch process stems from the fact that, when a vehicle rebounds from an initial collision with another vehicle or a stationary object (i.e., a vehicle collision event), crash detection calculations (e.g., delta velocity information) can indicate a different direction of force than that resulting from the initial collision. However, for implementing vehicle safety features in response to the initial collision, crash direction functionality and impact recognition functionality are concerned predominantly with the direction of force resulting from the initial collision.

Direction latch (i.e., dir_latch) is a calibratable parameter used in the latch process. As shown in FIG. 4, the direction latch parameter defines a corresponding latch radius upon which Y-direction latch threshold values are based. Y-direction latch thresholds are calculated similar to the impact zone thresholds discussed above but the radius dimension of the abovementioned circle equations is no longer a function of the X-direction delta velocity values V(X). Once an absolute value of the Y-direction delta velocity value V(Y) is greater than or equal to the Y-direction latch threshold value based on the corresponding X-direction delta velocity values V(X)

and/or the corresponding X-direction delta velocity values V(X) is greater than or equal to the direction latch value (i.e., latch circle radius), the algorithm generating the threshold information will cease calculating such information and the algorithm correspondingly determining the associated impact zones and/or impact sectors will thereafter continue to output the last determined impact sector (i.e., primary direction of force) as long as needed. The latch threshold is continuous. Acceleration readings are sampled and accumulated until the latch threshold is met.

Table 5 below is an example of a latch lookup table having latch threshold values used in determining impact quadrant information for the quadrants of FIGS. 1, 4, and 5 discussed above. For delta velocity information derived after a vehicle collision event, a latch threshold value (i.e., dir_latch_y) is obtained from the Table 5 by assessing table input values (i.e., dir_latch_x) as a function of the X-direction delta velocity values V(X). Contents of this quadrant latch lookup table are generated using the geometry of a circle. The circle radius (i.e., dir_latch) is set to a value of 10 and a resolution of the lookup table is set to 15 data points. The Y-direction latch threshold values are calculated based on the following equation:

$$\text{dir\_latch}\_y = (\text{dir\_latch}^2 - \text{dir\_latch}\_x^2);$$

where dir_latch_x=(n−1)/(14/dir_latch)n=1 . . . 15.

TABLE 5

Quadrant Latch Threshold Lookup Table

| dir_latch_x | dir_latch_x |
|---|---|
| 0.000 | 10.000 |
| 0.714 | 9.974 |
| 1.429 | 9.897 |
| 2.143 | 9.768 |
| 2.857 | 9.583 |
| 3.571 | 9.340 |
| 4.286 | 9.035 |
| 5.000 | 8.660 |
| 5.714 | 8.207 |
| 6.429 | 7.660 |
| 7.143 | 6.999 |
| 7.857 | 6.186 |
| 8.571 | 5.151 |
| 9.286 | 3.712 |
| 10.000 | 0.000 |

Table 6 below is an example of a latch lookup table having latch threshold values used in determining impact zone information for the impact zones of FIGS. 1 and 4 discussed above (i.e., first order of resolution impact zones). For delta velocity information derived after a vehicle collision event, a latch threshold value (i.e., dir1_latch_y) is obtained from the Table 6 by assessing table input values (i.e., dir1_latch_x) as a function of the X-direction delta velocity values V(X). Contents of this impact zone latch lookup table are generated using the geometry of a circle. The circle radius (i.e., dir_latch) is set to a value of 10, the first delta velocity threshold angle Θ(1) is set to 30 degrees, and a resolution of the lookup table is set to 15 data points. The Y-direction latch threshold values are calculated based on the following equation:

$$\text{dir1\_latch}\_x = R^*\text{COS } 30°; \text{ and}$$

$$\text{dir1\_latch}\_y = R^*\text{SIN } 30 \text{ degrees};$$

where R=(n−1)/(14/dir_latch)n=1 . . . 15.

TABLE 6

First Order Impact Zone Latch Threshold Lookup Table

| dir1_latch_x | dir1_latch_x |
|---|---|
| 0.000 | 0.000 |
| 0.619 | 0.357 |
| 1.237 | 0.714 |
| 1.856 | 1.071 |
| 2.474 | 1.429 |
| 3.093 | 1.786 |
| 3.712 | 2.143 |
| 4.330 | 2.500 |
| 4.949 | 2.857 |
| 5.667 | 3.214 |
| 6.186 | 3.571 |
| 6.804 | 3.929 |
| 7.423 | 4.286 |
| 8.042 | 4.643 |
| 8.660 | 5.000 |

Table 7 below is an example of a latch lookup table having latch threshold values used in determining impact zone information for the front and rear impact zones of FIG. 5 discussed above (i.e., second order of resolution impact zones). For delta velocity information derived after a vehicle collision event, a latch threshold value (i.e., dir2_latch_y) is obtained from the Table 7 by assessing table input values (i.e., dir2_latch_x) as a function of the X-direction delta velocity values V(X). Contents of this impact zone latch lookup table are generated using the geometry of a circle. The circle radius (i.e., dir_latch) is set to a value of 10, the first delta velocity threshold angle Θ(1) is set to 30 degrees, the second delta velocity threshold angle Θ(2) is set to 5 degrees, and a resolution of the lookup table is set to 15 data points. The Y-direction latch threshold values are calculated based on the following equation:

$$\text{dir2\_latch}\_x = R^*\text{COS } 5°; \text{ and}$$

$$\text{dir2\_latch}\_y = R^*\text{SIN } 5°;$$

where: R=(n−1)/(14/ira_dir_latch)n=1 . . . 15

TABLE 7

Second Order Impact Zone Latch Threshold Lookup Table

| dir2_latch_x | dir2_latch_x |
|---|---|
| 0.000 | 0.000 |
| 0.712 | 0.062 |
| 1.423 | 0.125 |
| 2.135 | 0.187 |
| 2.846 | 0.249 |
| 3.558 | 0.311 |
| 4.269 | 0.374 |
| 4.981 | 0.439 |
| 5.693 | 0.498 |
| 6.404 | 0.560 |
| 7.116 | 0.623 |
| 7.827 | 0.685 |
| 8.539 | 0.747 |
| 9.250 | 0.809 |
| 9.962 | 0.872 |

Figure 7:
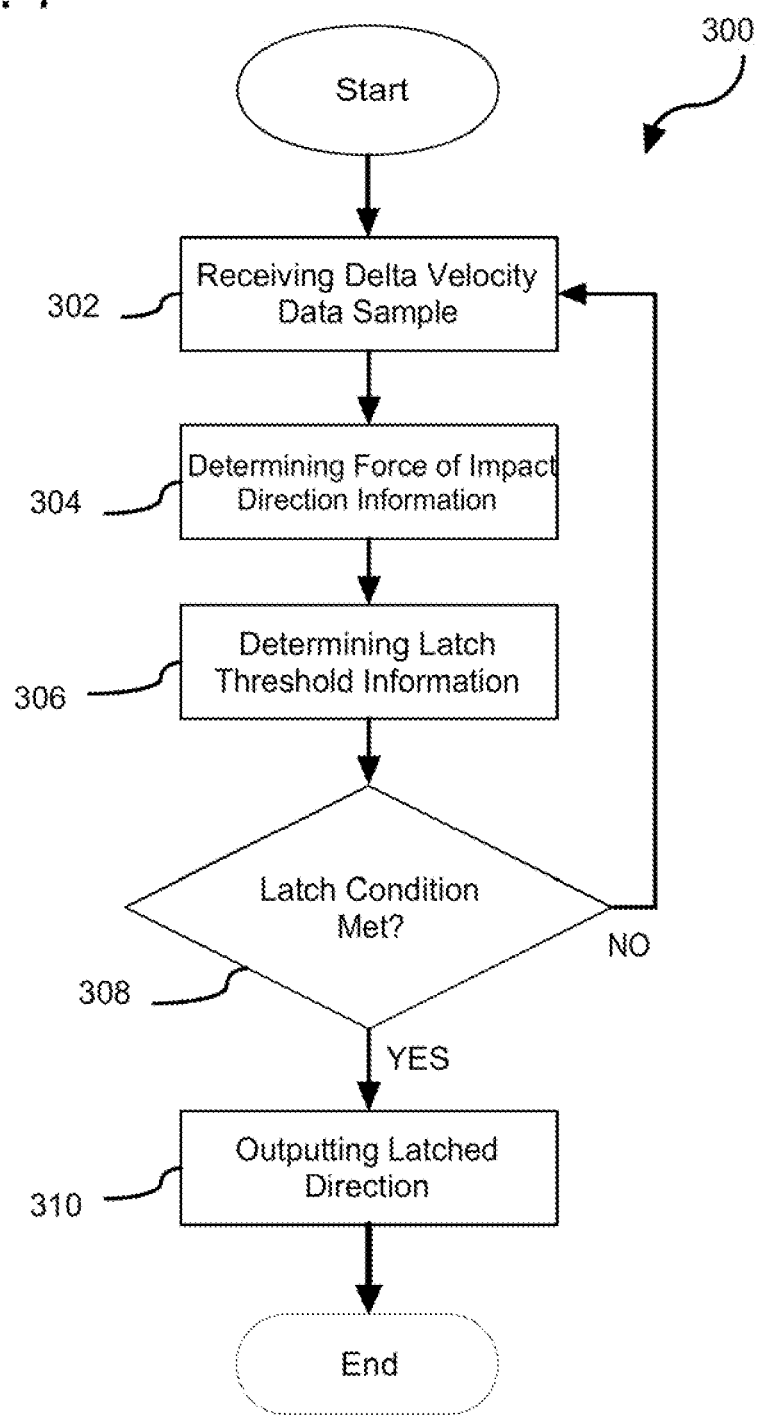
FIG. 7 is a flow diagram showing a force direction latching method configured in accordance with an embodiment of the inventive subject matter.

FIG. 7 shows a force direction latching method 300 configured in accordance with an embodiment of the inventive subject matter. The force direction latching method 300 accomplishes the abovementioned objective of determining when to stop calculating the direction of force from a vehicle collision event (i.e., as performed by a crash direction algorithm configured in accordance with an embodiment of the inventive subject matter) and holding the last direction of force that has been calculated. This last direction of force that is calculated and held is considered to be the primary direction of force resulting from the vehicle collision event and is outputted (e.g., as a particular impact sector of the vehicle) for use by one or more other systems (e.g., active safety systems) of the vehicle. The inventive subject matter is directed to supplying magnitude and direction information for a vehicle collision event for post impact actions and therefore is reactive to the impact, as opposed to predicting the impact. The inventive subject matter describes calculations using real-time signals and crash data to compute a latch threshold from equations of a circle. Because the system and method are reactive to the crash, the latching method may wait for the crash to come to a rest.

The method 300 begins with an operation 302 for sampling a source of delta velocity information (i.e., an X-direction delta velocity value and corresponding Y-direction delta velocity value) generated in response to a vehicle collision event. As disclosed above in reference to FIG. 1, a restraint control module can generate X-direction acceleration values and Y-direction acceleration values (i.e., acceleration information) and derive corresponding X-direction delta velocity values and Y-direction delta velocity values (i.e., delta velocity information) therefrom. Sampling can be at a processor defined sampling rate, algorithm specified sampling rate, or other sampling rate. In response to sampling the source of delta velocity information, an operation 304 is performed for determining force of impact direction information as a function of the sampled delta velocity information. In preferred embodiments, such determination of the force of impact direction information includes determining an impact sector as described above in reference to FIGS. 2-5.

The operation 302 for sampling involves sampling X-direction and Y-direction acceleration values. As the acceleration readings are sampled, a vector is created from the accumulation of samples. The samples are accumulated until the latch threshold is met, resulting in a vector providing both direction and magnitude of the impact. The resulting vector, direction and magnitude, may be used for post impact braking, stability control, fuel cut-off or other vehicle systems that may require control after an impact. The latch threshold of the inventive subject matter is continuous and reactive, even after a traditional threshold has been reached. The latch system prevents the signal from moving from one zone to another zone due to a secondary impact or even rotation of the vehicle after the primary impact, thereby keeping the "primary" direction of the force intact.

Thereafter (or in parallel with determining the impact direction information), an operation 306 is performed for determining latch threshold information. In preferred embodiments, determining the latch threshold information includes determining a Y-direction latch threshold value for each one of an impact quadrant (i.e., quadrant latch threshold value), a first order impact zone (i.e., first order impact zone latch threshold value), and a second order impact zone (i.e., second order impact zone latch threshold value). For example, the X-direction delta velocity value of the sampled delta velocity information can be used to acquire a corresponding Y-direction latch threshold value from a quadrant latch threshold lookup table (e.g., see discussion above in reference to Table 5), a corresponding Y-direction latch threshold value from a first order impact zone latch threshold lookup table (e.g., see discussion above in reference to Table 6), and a corresponding Y-direction latch threshold value from a second order impact zone latch threshold lookup table (e.g., see discussion above in reference to Table 7).

A direction latch parameter defines a corresponding latch radius upon which Y-direction latch threshold values are based. Y-direction latch thresholds are calculated similar to the impact zone thresholds discussed above but the radius dimension of the abovementioned circle equations is no longer a function of the X-direction delta velocity values V(X). Once an absolute value of the Y-direction delta velocity value V(Y) is greater than or equal to the Y-direction latch threshold value based on the corresponding X-direction delta velocity values V(X) and/or the corresponding X-direction delta velocity values V(X) is greater than or equal to the direction latch value (i.e., latch circle radius), the algorithm generating the threshold information will cease calculating such information and the algorithm correspondingly determining the associated impact zones and/or impact sectors will thereafter continue to output the last determined impact sector (i.e., primary direction of force) as long as needed.

In response to determining the force of impact direction information and the latch threshold information, an operation 308 is performed for determining if a latch condition exists for each one of the latch thresholds. A latch condition exists when an absolute value of the sampled Y-direction delta velocity value is found to be greater than one of the corresponding Y-direction latch threshold values or when an absolute value of the sampled X-direction delta velocity value is greater than the direction latch used in deriving the Y-direction latch threshold values (i.e., see discussion above in reference to Tables 5-7). If a latched condition does not exist for the any of the latch thresholds, the method 300 continues at the operation 302 for receiving another sample of the delta velocity information and thereafter performing the subsequent operations of the method 300. Otherwise, a latch condition is present for at least one of the latch thresholds and the direction corresponding to the latch thresholds (e.g., the quadrant, the first order impact zone, and/or the second order impact zone) based on the current sampled delta velocity information and an operation 310 is performed for outputting the latched direction (e.g., to a different control module of the electronic controller system of the vehicle). In preferred implementations, the latched direction is based on the highest resolution direction calculated for the sampled delta velocity information used in determining the latched condition (e.g., second order impact zone as opposed to first order impact zone if both are latched for the current instance of sampled delta velocity information).

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method carried out in a crash direction computing module on a vehicle, comprising the steps of:

sampling acceleration information, from accelerometers on the vehicle, resulting from a vehicle collision event, the acceleration information includes a first direction acceleration value and a second direction acceleration value;

determining, in the crash direction computing module, a first delta velocity threshold value using equations for a circle and a second direction delta velocity value;

determining, in the crash direction computing module, a latch threshold value using accumulated acceleration information and equations of a circle that define a latch circle radius but do not include the second direction delta velocity value;

creating a vector representative of a magnitude and direction of the vehicle collision event, the vector is created from the accumulated acceleration information when the latch threshold value is met; and outputting the vector to a control module of a system on the vehicle to perform an operation in one or more vehicle systems consisting of a restraint control system, a brake system, a stability control system, a steering system, and a fuel supply system.

2. The method of claim 1 wherein the step of creating a vector further comprises determining an impact zone associated with the direction of the vehicle collision event.

3. The method of claim 2 wherein:
the impact zone is a first impact zone when the second direction delta velocity value is greater than a positive instance of the first delta velocity threshold value;
the impact zone is a second impact zone opposite the first impact zone when the second direction delta velocity value is less than a negative instance of the first delta velocity threshold value;
the impact zone is a third impact zone when the second direction delta velocity value is greater than the negative instance of the first delta velocity threshold value, the second direction delta velocity value is less than positive instance of the first delta velocity threshold value, and the first direction delta velocity value is greater than zero; and
the impact zone is a fourth impact zone opposite the third impact zone the second direction delta velocity value is greater than the negative instance of the first delta velocity threshold value, the second direction delta velocity value is less than positive instance of the first delta velocity threshold value, and the first direction delta velocity value is less than zero.

4. The method of claim 3 wherein:
the first impact zone is a left side impact zone;
the impact zone is a right side impact zone;
the third impact zone is a front impact zone; and
the fourth impact zone is a rear impact zone.

5. The method of claim 4 wherein a first delta velocity threshold angle is a parameter calibrated to define an area of the front impact zone, an area of the side impact zones, and an area of the rear impact zone as a function of the delta velocity threshold angle.

6. The method of claim 3, further comprising:
determining an impact quadrant at which the impact of the vehicle collision event has occurred based on the acceleration information; and
determining an impact sector for the vehicle collision event based on both the impact quadrant and the impact zone.

7. The method of claim 6 wherein determining the impact zone further comprises the steps of:

determining a relative difference between the first delta velocity threshold value and the second direction delta velocity value;
determining a second delta velocity threshold value based on a second delta velocity threshold angle and the first direction delta velocity value;
determining a relative difference between the first delta velocity threshold value and the second direction delta velocity value; and
determining a relative difference between the second delta velocity threshold value and the second direction delta velocity value if the second direction delta velocity value is one of less than a positive instance of the first delta velocity threshold value and greater than a negative instance of the first delta velocity threshold value.

8. The method of claim 2 wherein determining the impact zone further comprises the steps of:
determining a relative difference between the first delta velocity threshold value and the second direction delta velocity value;
determining a second delta velocity threshold value based on a second delta velocity threshold angle and the first direction delta velocity value;
determining a relative difference between the first delta velocity threshold value and the second direction delta velocity value; and
determine a relative difference between the second delta velocity threshold value and the second direction delta velocity value if the second direction delta velocity value is one of less than a positive instance of the first delta velocity threshold value and greater than a negative instance of the first delta velocity threshold value.

9. A vehicle system for determining an impact force direction and magnitude, comprising:
an acceleration sensing module generating acceleration information resulting from a vehicle collision event, wherein the acceleration information includes a first direction acceleration value and a second direction acceleration value;
a crash direction computing module coupled to the acceleration sensing module, receiving, sampling and accumulating the acceleration information therefrom and configured to determine impact magnitude and direction information resulting from the vehicle collision event, including deriving a first direction delta velocity value from the first direction acceleration value, deriving a second direction delta velocity value from the second direction acceleration value, determining a latch threshold value using equations for a circle that define a latch circle radius, a first delta velocity threshold value based on a delta velocity threshold angle and the first direction delta velocity value, the crash direction computing module creating a vector from the accumulated acceleration information when the latch threshold value has been met, the vector being representative of a magnitude and a direction of the vehicle collision event including a primary force of impact direction, and the crash direction computing module outputting the vector to a control module of a vehicle system to perform an operation in one or more vehicle systems consisting of a restraint control system, a brake system, a stability control system, a steering system, and a fuel supply system.

10. The vehicle of claim 9 wherein the first delta velocity threshold angle is a parameter calibrated to define an area of a front impact zone, an area of side impact zones, and an area of a rear end impact zone as a function of the delta velocity threshold angle.

11. The vehicle of claim 9 wherein determining the impact zone includes determining a relative difference between the first delta velocity threshold value and the second direction delta velocity value.

12. The vehicle of claim 11 wherein:
the impact zone is a first impact zone when the second direction delta velocity value is greater than a positive instance of the first delta velocity threshold value;
the impact zone is a second impact zone opposite the first impact zone when the second direction delta velocity value is less than a negative instance of the first delta velocity threshold value;
the impact zone is a third impact zone when the second direction delta velocity value is greater than the negative instance of the first delta velocity threshold value, the second direction delta velocity value is less than positive instance of the first delta velocity threshold value, and the first direction delta velocity value is greater than zero; and
the impact zone is a fourth impact zone opposite the third impact zone when the second direction delta velocity value is greater than the negative instance of the first delta velocity threshold value, the second direction delta velocity value is less than positive instance of the first delta velocity threshold value, and the first direction delta velocity value is less than zero.

13. The vehicle of claim 11 wherein determining the impact direction information further includes:
determining an impact quadrant at which the impact of the vehicle collision event has occurred based on the acceleration information; and
determining an impact sector for the vehicle collision event based on both the impact quadrant and the impact zone.

14. The vehicle of claim 13 wherein determining the impact zone includes:
determining a relative difference between the first delta velocity threshold value and the second direction delta velocity value;
determining a second delta velocity threshold value based on a second delta velocity threshold angle and the first direction delta velocity value;
determining a relative difference between the first delta velocity threshold value and the second direction delta velocity value; and
determining a relative difference between the second delta velocity threshold value and the second direction delta velocity value if the second direction delta velocity value is one of less than a positive instance of the first delta velocity threshold value and greater than a negative instance of the first delta velocity threshold value.

15. The vehicle of claim 9 wherein determining the impact zone includes:
determining a relative difference between the first delta velocity threshold value and the second direction delta velocity value;
determining a second delta velocity threshold value based on a second delta velocity threshold angle and the first direction delta velocity value;
determining a relative difference between the first delta velocity threshold value and the second direction delta velocity value; and
determining a relative difference between the second delta velocity threshold value and the second direction delta velocity value if the second direction delta velocity value is one of less than a positive instance of the first delta velocity threshold value and greater than a negative instance of the first delta velocity threshold value.

16. An electronic controller system on a vehicle to carry out operations for:
acquiring acceleration information resulting from a vehicle collision event, the acceleration information includes a first direction acceleration value and a second direction acceleration value, the first direction acceleration value corresponds to a direction extending substantially perpendicular to a direction corresponding to the second direction acceleration value;
determining a first direction delta velocity value based on the first direction acceleration value;
determining a second direction delta velocity value based on the second direction acceleration value;
determining a first delta velocity threshold value using equations for a circle and based on a first delta velocity threshold angle and the first direction delta velocity value;
determining a latch threshold value using accumulated acceleration information and equations of a circle to define a latch circle radius;
creating a vector representative of a magnitude and direction of the vehicle collision event, the vector being created from the accumulated acceleration information when the latch threshold value is met; and
outputting the vector to a control module of a system on the vehicle;
determining an impact zone of the vehicle at which an impact from the vehicle collision event has occurred, wherein the impact zone is determined based on the vector output; and
performing an operation, in one or more vehicle systems, in response to the impact zone determination, the one or more vehicle systems consisting of a restraint control system, a brake system, a stability control system, a steering system, and a fuel supply system.

17. The electronic controller system of claim 16 wherein the first delta velocity threshold angle is a parameter calibrated to define an area of a front impact zone, an area of side impact zones, and an area of a rear end impact zone as a function of the delta velocity threshold angle.

18. The electronic controller system of claim 16 wherein determining the impact zone includes determining a relative difference between the first delta velocity threshold value and the second direction delta velocity value.

19. The electronic controller system of claim 18 wherein:
the impact zone is a first impact zone when the second direction delta velocity value is greater than a positive instance of the first delta velocity threshold value;
the impact zone is a second impact zone opposite the first impact zone when the second direction delta velocity value is less than a negative instance of the first delta velocity threshold value;
the impact zone is a third impact zone when the second direction delta velocity value is greater than the negative instance of the first delta velocity threshold value, the second direction delta velocity value is less than positive instance of the first delta velocity threshold value, and the first direction delta velocity value is greater than zero; and
the impact zone is a fourth impact zone opposite the third impact zone when the second direction delta velocity value is greater than the negative instance of the first delta velocity threshold value, the second direction delta velocity value is less than positive instance of the first delta velocity threshold value, and the first direction delta velocity value is less than zero.

20. The electronic controller system of claim 19 wherein:
the first impact zone is a left side impact zone;
the impact zone is a right side impact zone;
the third impact zone is a front impact zone; and
the fourth impact zone is a rear impact zone.

21. The electronic controller system of claim 20 wherein the first delta velocity threshold angle is a parameter calibrated to define an area of the front impact zone, an area of the side impact zones, and an area of the rear impact zone as a function of the delta velocity threshold angle.

22. The electronic controller system of claim 18 wherein the set of instructions is further configured for causing the at least one data processing device to carry out operations for:
   determining an impact quadrant at which the impact of the vehicle collision event has occurred based on the acceleration information; and
   determining an impact sector for the vehicle collision event based on both the impact quadrant and the impact zone.

23. The electronic controller system of claim 22 wherein determining the impact zone includes:
   determining a relative difference between the first delta velocity threshold value and the second direction delta velocity value;
   determining a second delta velocity threshold value based on a second delta velocity threshold angle and the first direction delta velocity value;
   determining a relative difference between the first delta velocity threshold value and the second direction delta velocity value; and
   determining a relative difference between the second delta velocity threshold value and the second direction delta velocity value if the second direction delta velocity value is one of less than a positive instance of the first delta velocity threshold value and greater than a negative instance of the first delta velocity threshold value.

24. The electronic controller system of claim 16 wherein determining the impact zone includes:
   determining a relative difference between the first delta velocity threshold value and the second direction delta velocity value;
   determining a second delta velocity threshold value based on a second delta velocity threshold angle and the first direction delta velocity value;
   determining a relative difference between the first delta velocity threshold value and the second direction delta velocity value; and
   determining a relative difference between the second delta velocity threshold value and the second direction delta velocity value if the second direction delta velocity value is one of less than a positive instance of the first delta velocity threshold value and greater than a negative instance of the first delta velocity threshold value.

* * * * *